(12) United States Patent
Miller

(10) Patent No.: US 7,668,677 B2
(45) Date of Patent: Feb. 23, 2010

(54) ERROR CORRECTION METHOD FOR A DISPLACEMENT SENSOR SIGNAL

(75) Inventor: Bernhard Miller, Weil der Stadt (DE)

(73) Assignee: KNORR-BREMSE Systeme für Nutzfahrzeuge GmbH, München (DE)

( * ) Notice: Subject to any disclaimer, the term of this patent is extended or adjusted under 35 U.S.C. 154(b) by 94 days.

(21) Appl. No.: 11/597,257

(22) PCT Filed: May 20, 2005

(86) PCT No.: PCT/EP2005/005475

§ 371 (c)(1),
(2), (4) Date: Feb. 21, 2008

(87) PCT Pub. No.: WO2005/114110

PCT Pub. Date: Dec. 1, 2005

(65) Prior Publication Data

US 2008/0221821 A1    Sep. 11, 2008

(30) Foreign Application Priority Data

May 21, 2004    (DE)    ........................ 10 2004 025 156

(51) Int. Cl.
*G01C 17/38*    (2006.01)
(52) U.S. Cl. ........................................................ 702/94
(58) Field of Classification Search .................. 702/94, 702/95, 150, 151, 158, 163
See application file for complete search history.

(56) References Cited

U.S. PATENT DOCUMENTS 5,353,174 A * 10/1994 Uno .................... 360/78.06

| 5,535,142 A | 7/1996 | Mehnert et al. |
| 5,666,034 A | 9/1997 | Seoung et al. |
| 5,773,938 A | 6/1998 | Seoung et al. |
| 5,956,659 A | 9/1999 | Spies et al. |
| 6,538,428 B1 | 3/2003 | Sohn |

FOREIGN PATENT DOCUMENTS

| CH | 397 261 | 8/1965 |
| CN | 1166722 | 12/1997 |
| DE | 42 24 225 | 1/1994 |
| DE | 43 20 834 | 4/1994 |
| DE | C-43 18 263 | 1/1995 |
| DE | 197 12 622 | 10/1998 |
| DE | 100 51 048 | 4/2002 |
| EP | 1 353 152 | 10/2003 |

OTHER PUBLICATIONS

Translation of International Preliminary Report on Patentability from International Patent Application No. PCT/EP2005/005475, Dec. 7, 2006.

(Continued)

*Primary Examiner*—Drew A Dunn
*Assistant Examiner*—Stephen J Cherry
(74) *Attorney, Agent, or Firm*—Kenyon & Kenyon LLP

(57) ABSTRACT

A method and device for correcting an error caused by electromagnetic interference, in a signal of an inductive displacement sensor or angle sensor, in that when known activation of at least one component which causes electromagnetic interference occurs and there is a known error resulting therefrom in the sensor signal of the inductive displacement sensor or angle sensor the error in the measured sensor signal is corrected.

12 Claims, 1 Drawing Sheet

OTHER PUBLICATIONS

Translation of Written Opinion of the International Searching Authority from International Patent Application No. PCT/EP2005/005475, Oct. 12, 2005.

Letter from Chinese associate dated Apr. 18, 2008, with English description of Office Action dated Mar. 28, 2008 received for Chinese patent application CN 200580016320.5.

* cited by examiner

ERROR CORRECTION METHOD FOR A DISPLACEMENT SENSOR SIGNAL

FIELD OF THE INVENTION

The present invention relates to a method and a device for correcting an error in a signal of an inductive displacement sensor.

BACKGROUND INFORMATION

For measuring displacement in motor vehicles, inductive displacement sensors may be used since in addition to their robustness to ambient influences such as changes in temperature, shaking stress and soiling they are also relatively cost effective to manufacture.

If electromagnetic components, for example solenoids, are used in the vicinity of such an inductive displacement sensor, the sensor is frequently subjected to an interfering influence when a solenoid valve is actuated.

There are various ways of minimizing these disruptive measuring errors of the sensor.

Sensors may be frequently surrounded with a metallic screen sleeve in order to screen off external electromagnetic alternating fields and reduce them to an acceptable degree. However, these screen sleeves make the sensor larger and more expensive. While the sensors are composed of a coil and a plastic injection-molded sheath surrounding them, and thus have a low intrinsic weight, the screen sleeves are manufactured from a comparatively thick and thus heavy steel casing.

These screen sleeves are frequently fabricated from material which is difficult to work and thus also increases costs.

German patent document no. 100 51 048 A1 discusses a method of preventing such disruptive influence of external magnetic fields on an inductive sensor by virtue of the fact that the time when the sensor value is read in is matched to the actuation times of the solenoid valves in such a way that the measuring time of the sensor always lies outside the actuation times of the solenoid valves.

However, this may only be possible if there are sufficiently frequent and correspondingly long times of rest between the actuations of the solenoid valve in which periods the sensor value can be registered. This results in disadvantages in terms of the dynamic tracking speed when there are rapid changes in sensor value.

In addition to the influence from electromagnetic fields, interference from electrical fields acting on the inductive displacement sensor is also possible.

German patent document no. 43 18 263 discusses a method and a circuit for temperature-compensated starting up of a plurality of predefined positions. The core idea of this patent is that for precise position control the displacement sensor which is used is not compensated but rather conversely the anticipated sensor value for the set point positions which are to be adopted are calculated in advance in accordance with the respectively prevailing temperatures and then positioned to this value.

SUMMARY OF THE INVENTION

The exemplary methods and/or exemplary embodiments of the present invention are based on the object of configuring a method and a device which permit an expensive screen sleeve to be dispensed with and at the same time sensor signal values to be registered and output continuously independently of possible activations of the solenoid valve. In this context, the interference described above will be eliminated or at least reduced to an acceptable degree by the sensor evaluation.

This object may be achieved by the method and the device of the exemplary methods and/or exemplary embodiments of the present invention, as described herein.

In the exemplary method of the present invention for correcting an error in a signal, caused by electromagnetic interference, of an inductive displacement sensor or angle sensor, when known activation of at least one component which causes electromagnetic interference occurs and there is a resulting known error in the sensor signal of the inductive displacement sensor or angle sensor the error in the measured sensor signal is corrected. Compared to the prior art this provides the advantage of having available sensor signals which can be used at any time with a high tracking speed when there are rapid changes in displacement without having to apply an expensive screening sleeve which takes up space.

These advantages of the exemplary methods and/or exemplary embodiments of the present invention are particularly effective when the component causing electromagnetic interference is a solenoid valve.

In one advantageous embodiment of the present invention, a microcontroller controls both the sensor and the at least one component. As a result, electronic components and connecting lines are spared. In one variant, even though the microcontroller does not control the at least one component it registers its actuation signals and evaluates them.

An error correction value is advantageously stored as a time-dependent characteristic curve. In this way there is a high degree of reliability that a reproducible systematic error can be corrected with sufficient precision.

The correction value may be dependent on the level of the actuation voltage of the component. This is because the relatively high actuation voltage of the component generally leads to an interference field emission and thus to a relatively large error. In the configuration of the component as a solenoid valve, the level of the actuation voltage is included directly in the magnitude of the magnetic flux, and as a result when the actuation times are the same, i.e. when there is an equally fast change in the overall amplitude of the magnetic flux, the change in flux is also proportional to the actuation voltage. The magnitude of the change in flux in turn determines the level of the inductively input error signal.

In another exemplary embodiment of the present invention, a correction value characteristic curve is adaptively determined for this purpose. Systematic shifts in the error can be better corrected by adaptively adjusting the error correction.

When the displacement or angle is at a limit position, the error-induced changes in the error signal are advantageously recorded and stored as new correction values during the activation of the component. In the error-free state, an invariable signal corresponds to a limit position of the displacement or angle. If, nevertheless, a change is recorded, this is due to an error. In this way, the error in the sensor signal which is caused by the actuation of the component can easily be determined.

Deviations in the sensor signal which are recorded during the activation of the component are advantageously buffered and adopted as a new correction value characteristic curve if the sensor displacement signal has not changed before or after the activation of the component.

The newly recorded correction values are low pass filtered for this purpose as a new correction value characteristic curve before they are stored. As a result, fast, irreproducible errors and statistically atypical values are eliminated.

In an exemplary embodiment of the present invention, error correction values for the actuations of coarse adjustment and fine adjustment solenoid valves are determined separately.

When there are a plurality of component sensor units and comparable influence a correction value which is determined for one component sensor unit may be transmitted to the other component sensor units. This allows a saving in computing time and storage space.

In another exemplary embodiment of the present invention, the component is used to set a coupling actuator. In this context, the component can be a solenoid valve which controls a pneumatic activation of the coupling actuator.

DETAILED DESCRIPTION

Figure 1:
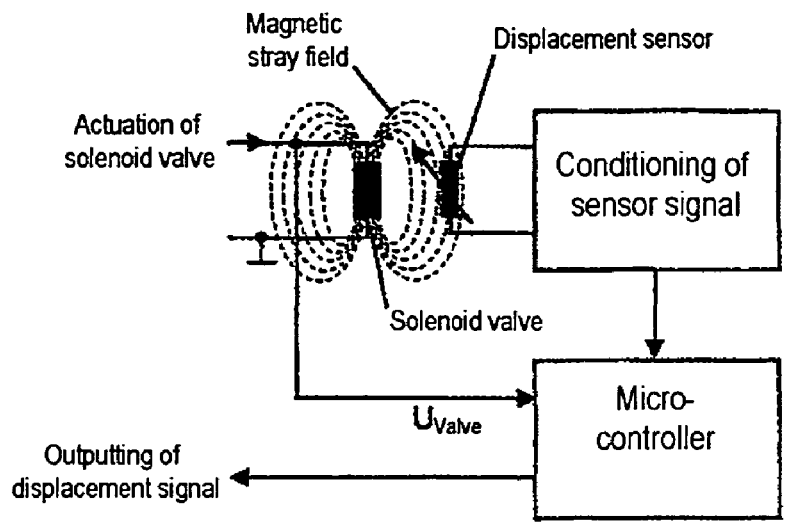
FIG. 1 shows a schematic illustration of an inductive displacement sensor with electronic conditioning of the displacement signal.

FIG. 1 shows an inductive displacement sensor with an electronic displacement signal conditioning arrangement in whose spatial proximity a solenoid valve is operated. The electromagnetic stray field which is generated when the magnet of the solenoid valve switches generate an induction voltage in the inductive displacement sensor, which voltage gives rise to an error signal in the measuring signal of the inductive displacement sensor. A microcontroller to which an actuation signal of the solenoid valve is also made available as an input value as well as the conditioned sensor signal, can detect the solenoid valve actuation times and performs error correction when the solenoid valve is activated and outputs a displacement signal on which error correction has been performed. The displacement signal which is read in incorrectly at the time of an actuated solenoid valve can be set up against a correction factor which is stored over time, and can thus be compensated so that the displacement signal to be output can continue to be output virtually free of errors despite the presence of interference.

Figure 2:
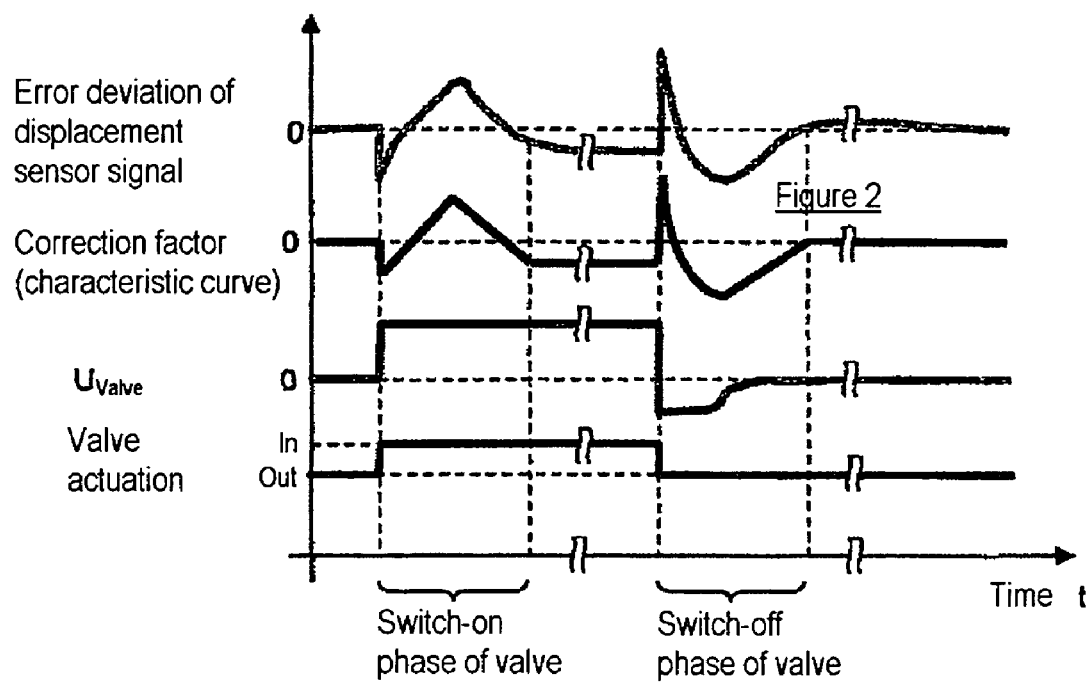
FIG. 2 shows diagrams of an errored displacement sensor signal, of a chronological correction value characteristic curve, of a voltage profile for actuating a solenoid valve and a digital activation signal of this solenoid valve.

FIG. 2 shows in four diagrams from top to bottom an errored displacement sensor raw signal, a chronological correction value function which is generated by a microcontroller, a voltage profile for actuating a solenoid valve and a digital actuation signal of the solenoid valve. The switching on and switching off of the solenoid valve generates in each case a peak in the signal of the displacement sensor with opposite polarity. The curve profile is similar to that for a smooth derivation function. The correction value profile approximates well to the error signal. The correction factor which is mapped over time as a characteristic curve is formed starting with the switching on and switching off of the solenoid value and subtracted from the errored sensor signal. As a result, the measured error deviation of the sensor signal is compensated and output without errors.

The stored chronological characteristic curve of the correction factor is dependent on the type of solenoid valve and the spatial installation position with respect to the sensor. It can thus be determined once and stored in the microcontroller. Only the level of the correction factor varies against the actuation voltage $U_{Ventil}$ which is stored at the solenoid valve. By registering the actuation voltage $U_{Ventil}$ or the battery voltage it is possible to correspondingly adapt the amplitude of the correction characteristic curve (for example by multiplication) and thus still largely minimize the residual error in the sensor signal.

As an alternative to the error correction with a stored characteristic curve it is possible also to adaptively determine the correction factor characteristic curve.

By using a microcontroller, there is the possibility, for the application case of the error correction method in a coupling actuator, of determining the error correction characteristic curve adaptively.

If, despite actuation of the solenoid valves, no change occurs in the displacement signal, this may be a sign that a stop has been reached, in particular in the example of the coupling actuator it can be evaluated as detection of a clutch which is already closed or a clutch which is open up to the stop. If the deviations in the sensor signal which have occurred are then buffered during the actuation of the valve, these buffered displacement sensor deviations which are measured during the chronological sequence can be adopted as a new correction characteristic curve when a steady-state sensor displacement is detected. Low-pass filtering for the adoption of these new characteristic values permits protection against possible sporadic measuring errors. This error correction characteristic curve can be respectively determined separately for a coarse adjustment valve and a fine adjustment valve provided that the spatial distances between the two valves and the sensor are different.

Provided that the respective other valves of the coupling have precisely the same spatial distance from the sensor, these new correction values can also be transmitted to the other valves.

The invention claimed is:

1. A method for correcting an error caused by electromagnetic interference in a signal of one of an inductive displacement sensor and angle sensor, the method comprising:
   measuring a sensor signal of the one of the inductive displacement sensor and the angle sensor; and
   correcting the error in the measured sensor signal when a known activation of at least one component, which causes electromagnetic interference, occurs, and there is a known error resulting therefrom in the sensor signal of the one of the inductive displacement sensor and the angle sensor;
   wherein the at least one component, which causes electromagnetic interference, includes a solenoid valve.

2. The method of claim 1, wherein a microcontroller is operable to (i) control the sensor and (ii) control the at least one component or register and evaluate its actuation signals.

3. The method of claim 1, wherein an error correction value is stored as a time-dependent characteristic curve.

4. The method of claim 3, wherein the correction value is dependent on a level of an actuation voltage of the at least one component.

5. The method of claim 1, wherein a correction value characteristic curve is determined adaptively.

6. The method of claim 5, wherein at an end position of one of a displacement and an angle, error-induced changes in the sensor signal during activation of the at least one component are recorded as new correction values and stored.

7. The method of claim 6, wherein deviations of the sensor signal which are recorded during activation of the at least one component are buffered and accepted as a new correction value characteristic curve if it is known that an actual displacement has not changed before or after activation of the at least one component.

8. The method of claim 7, wherein the newly recorded correction values are low-pass filtered before they are stored as a new correction value characteristic curve.

9. The method of claim 1, wherein error correction values for actuating coarse adjustment and fine adjustment solenoid valves are determined separately.

10. The method of claim 1, wherein when there are a plurality of component sensor units and there is comparable influencing, a correction value which is determined for a component sensor unit is transmitted to the other component sensor units.

11. The method of claim 1, wherein the at least one component sets a coupling actuator.

12. A device for setting one of a displacement value and an angle, comprising:
- at least one actuating component which includes a solenoid valve;
- at least one inductive displacement sensor or angle sensor; and
- at least one microcontroller, wherein correction characteristic curves are stored in the microcontroller and used, when the at least one actuating component is activated, to correct errors, caused by electromagnetic interference, in a measured sensor signal of the at least one inductive displacement sensor or angle sensor.

* * * * *